Figure 6:
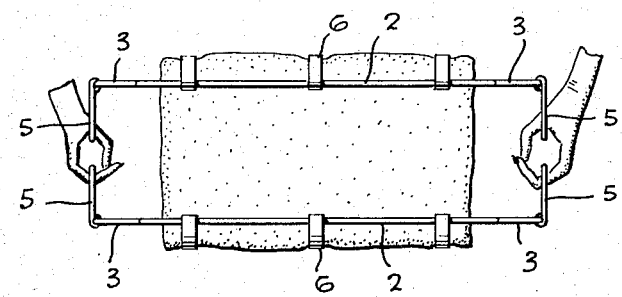

Dec. 26, 1967   V. M. YOUNG ET AL   3,359,889
TURKEY TURNER
Filed March 1, 1965                                2 Sheets-Sheet 1
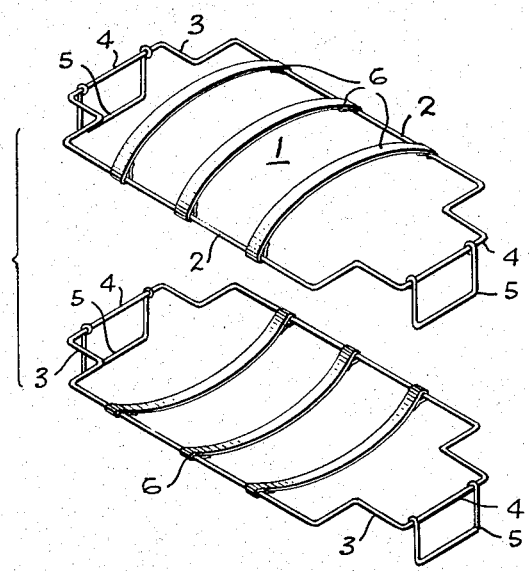
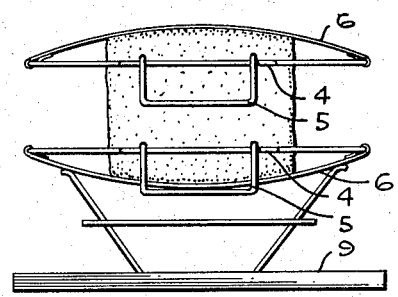
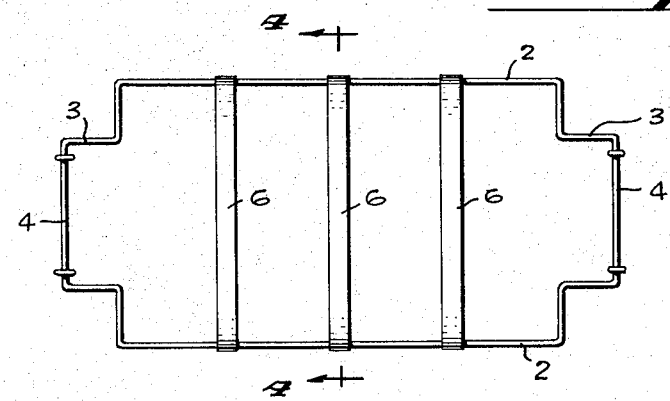
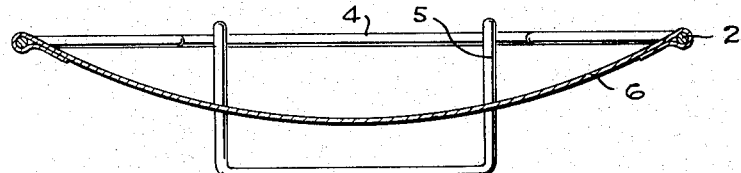
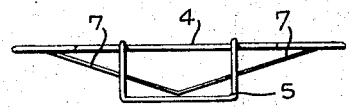
INVENTORS
VIRGINIA M. YOUNG
GARTH L. YOUNG, JR.
BY Philip Subkow
ATTORNEY Dec. 26, 1967 V. M. YOUNG ETAL 3,359,889

TURKEY TURNER

Filed March 1, 1965 2 Sheets-Sheet 2

INVENTORS
VIRGINIA M. YOUNG
GARTH L. YOUNG, JR.
BY Philip Subkow

ATTORNEY

United States Patent Office 3,359,889
Patented Dec. 26, 1967

3,359,889
TURKEY TURNER
Virginia M. Young and Garth L. Young, Jr., both of 139 S. Carmelina Ave., Los Angeles, Calif. 90049
Filed Mar. 1, 1965, Ser. No. 435,973
3 Claims. (Cl. 99—426)

This invention relates to roasting and grilling device and has for its object to provide a culinary aid for the roasting of meats such as beef, lamb and pork roasts, fowl, such as chicken and turkeys and all other types of food which is subject to a roasting or grilling operation, all herein referred to generically as meats.

In roasting or grilling of meats, it is desirable to turn the meat during the roasting process in order to obtain an even and uniform roasting operation. In the grilling operation, the meat is exposed to an open source of heat. It is usual in such operation to turn the meat on a spit to obtain an even grilling of the meat. When the meat is a steak or chop, it may be turned by using a fork. In roasting, the meat is heated in an oven. Such meats are in size and weight in the usual case, larger than steaks or chops. It is usual in roasting such large sized meats, in order to obtain an even roast, the meat must be turned at various stages during roasting. It is usual to attempt to turn the meat with a fork or to employ a fork and spatula or spoon.

The use of a fork in any of the above procedures, is inconvenient and results in piercing of the meat. The piercing of the meat permits the escape of juices. This is usually undesirable. Furthermore, for large roasts, this is frequently very inconvenient for the average housewife. In such cases, it becomes necessary to grasp the meat directly with the hands in order to turn the meat. Insulation is required to prevent burning of the hands. Padded gloves, towels or dishclothes are usually employed. The result is soiling of the material employed as insulation. If the meat is of large size, the heaving and hauling required sometimes results in catastrophe when the hot and frustrated housewife drops the meat.

We have now invented a device which has for its object, the solution of the above problems. It has for its object, a device which facilitates turning the meat and helps the inexperienced cook to produce even roasts and grills with a minimum of effort.

In a generic sense, the device of our invention is a cradle on which the meat may be placed. Means are provided to grasp and hold the cradle manually so that it may be turned manually. Means are also provided to secure the meat in the frame during turning or transporting of the meat.

In a preferred embodiment of our invention, we employ a sectional cradle made up of two cradle sections of like construction. Each cradle section is composed of a frame formed of a pair of spaced longitudinal members to which are secured a plurality of spaced cross members connecting said longitudinal members. At each end of the frame, we have provided handles which are connected to the frame. By placing the meat on one of said cradle sections and placing the other cradle section over the top of the meat, the adjacent handles on the top and bottom cradle sections may be grasped two in each hand. The meat may be placed on the lower cradle section and the upper cradle placed over the meat. The grasping of the handles draws the cradle sections together, clamping the meat between the cradle sections. The meat may then be securely transported to the oven and inserted. When it is desired to turn the meat, the cradle is withdrawn and the handles grasped. The meat is then securely held in the cradle. The cradle may then be inverted to rotate the meat and the cradle inserted into the roasting oven.

Figure 7:
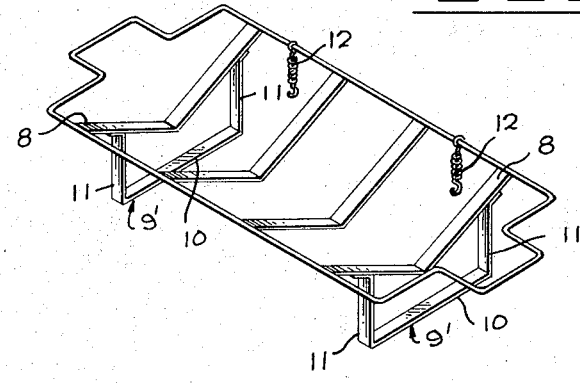
Figure 8:
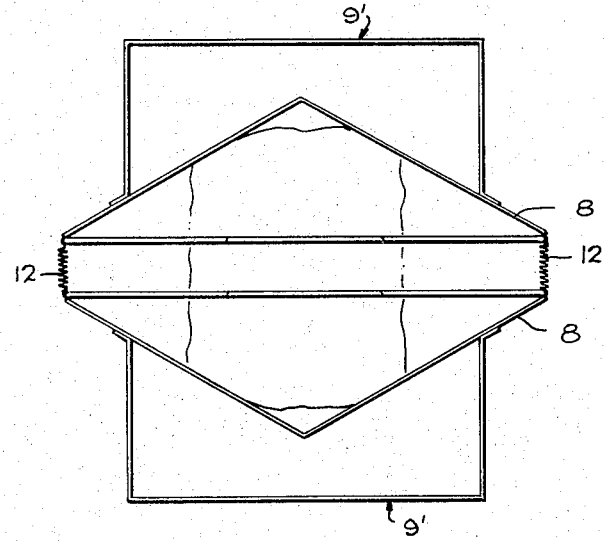

These and other objects of our invention will be further described by reference to the drawings of which:

FIG. 1 shows a perspective view of two cradles of identical construction, one turned upside down with respect to the other;
FIG. 2 shows the cradles in position on the roasting rack with the meat shown in section;
FIG. 3 is a plan view of one of the cradles shown in FIG. 1;
FIG. 4 is an end view of FIG. 4 with the handles dependent from the frame;
FIG. 5 shows a modification of the cradle in FIG. 1;
FIG. 6 illustrates how the cradles of FIGS. 1 to 5 may be grasped by the cook in transporting and turning the meat;
FIG. 7 is a modification of the cradles of our invention; and
FIG. 8 is an end view of FIG. 7.

In FIG. 1, 1 is a generally rectangular frame formed, for example, of wire to produce two longitudinal frame members 2, spaced from each other, and two necked down sections 3 terminating in ends 4. On each of the ends 4 is a handle 5, hinged to be freely rotated on the ends 4. Cross members 6 are connected at their ends to the members 2 and are spaced from each other.

In the form of FIG. 1, the configuration of the cross members 6 are such that they produce a concave arcuate support. Thus, they may be made of flexible bands. The ends of the bands are bent over the frame members 2 and are riveted or spot welded to secure them in place on the frame members 2.

The cross members may be flat, i.e., substantially coplanar with the frame members, but preferably they project from the plane of the frame members. They may be arcuate or of any other curve or form, for example, they may form an obtuse angle as shown in FIG. 5. The cross members may be straps 8, as shown in FIG. 7, or relatively rigid wires or straps spot welded at their ends to the frame member 2, as shown in FIG. 5.

FIG. 6 illustrates how the cradles may be employed to hold meats whose height is greater than twice the vertical height of the members 6, or 7 or 8 if used, and measured from the frame 2. The handles extend from the ends 4, one up and one down, as shown in FIG. 6, to permit the grasping of the handles by the hands, as illustrated in FIG. 6. The meat is thus clamped in position. The cradles accommodate large sized meats for roasting.

FIG. 7 illustrates an alternative construction which does not employ the hinged handles 5. The ends 4 of the frame forms the handles. The construction in other respects is similar to that of FIG. 5. As illustrated, the cross members 8 are straps instead of wires, as shown in FIG. 5. The height of the meat which is suitable for such frames, is limited by the separation of the handles of the upper and lower cradle sections. The height is that which is tolerable for the size of the cooks hand. Some latitude is made possible by making the frame members 2 somewhat flexible so that the top and bottom handles may be drawn together as the frame bends over the meat.

FIG. 2 illustrates one means for supporting the cradles in a separate rack 9 which may be placed in the oven. The form of the rack, as shown in FIG. 2, may be of any desired configuration. The details of construction of the rack, apart from its use when the cradles of our invention, forms no part of this invention.

An improved construction, which is part of our invention, is shown in FIGS. 7 and 8. Each cradle section, one shown in FIGS. 7 and 8, carries a cradle support in the shape of a rectangular section 9' having a base 10 and two upright members 11, one at each end of the base 10, made by bending the strap forming the base 10 into right angles. The upright members 11 are each welded to an end member 8; there being two such supports, one at each end of cross member 8 of the cradle section.

An additional feature which is helpful in handling of the meats in the cradle is the provision of freely swinging hooks 12 having a central helical coil section placed on one side of each cradle. In assembling the cradle, the hooks are so positioned so that hooks appear on each side of the cradle. When the meat is in position, the hooks on one of the cradles are rotated to engage the longitudinal frame member of the other cradle. The hooks may be disengaged and be replaced with hooks of different length to accomodate meat of different size. The helical section of the hooks permit of considerable latitude as to meat dimension. This is facilitated by providing the engaging ends to be flexible at the hook so that it can be snapped on and off the longitudinal members.

While we have described particular embodiments of our invention for the purpose of illustration, it should be understood that various modifications and adaptations thereof may be made within the spirit of the invention, as set forth in the appended claims.

We claim:

1. A roasting cradle comprising an upper cradle section and a lower cradle section, each cradle section comprising a frame, said frame comprising a pair of spaced longitudinal frame members and a pair of end members attached to the ends of said longitudinal frame members, handles swingingly attached to said end members, and flat rigid band cross members connected at each end of said cross members to said frame members, said cross members being spaced apart from each other along said frame members, portions of said cross members projecting from the plane of said frame members to form an obtuse angle.

2. A roasting cradle comprising an upper cradle section and a lower cradle section, each cradle section comprising a frame, said frame comprising a pair of spaced longitudinal frame members and a pair of end members attached to the ends of said longitudinal frame members, flat rigid band cross members connected at each end of said cross members to said frame members, said cross members being spaced apart from each other along said frame members, portions of said cross members projecting from the plane of said frame members to form an obtuse angle, and handles integral with the end members and coplanar with the frame, said handles being of a width less than that of the frame and a pair of leg members secured to individual cross members and located intermediate the handles.

3. A roasting cradle as in claim 2, in which hooks are provided for interconnecting a longitudinal frame member of one of said cradle sections to the adjacent opposite longitudinal frame member of the other cradle section.

References Cited

UNITED STATES PATENTS

| | | | |
|---|---|---|---|
| 95,909 | 10/1869 | Johnson et al. | 99—402 |
| 271,321 | 1/1883 | Dyer | 220—4 |
| 1,677,593 | 7/1928 | McEwan | 220—4 |
| 2,101,487 | 12/1937 | Anderson | 220—4 |
| 2,297,332 | 9/1942 | Stewart. | |
| 2,337,142 | 12/1943 | Williams | 294—1 |
| 2,703,046 | 3/1955 | Ahlquist | 294—1 X |
| 2,973,218 | 2/1961 | Schaum | 291—1 |
| 3,202,086 | 8/1965 | Brubaker | 99—351 |
| 553,363 | 1/1896 | Sickels | 99—427 |
| 2,205,064 | 6/1940 | Irwin | 99—426 |
| 2,616,360 | 11/1952 | Thompson | 99—419 X |
| 3,084,618 | 4/1963 | Dieterich | 99—427 |

FOREIGN PATENTS

| | | |
|---|---|---|
| 680,447 | 2/1964 | Canada. |

WALTER A. SCHEEL, *Primary Examiner.*

J. M. NEARY, *Assistant Examiner.*